Nov. 20, 1928.  1,692,289
N. P. DAMGAARD
FLOAT VALVE
Filed Dec. 28, 1925
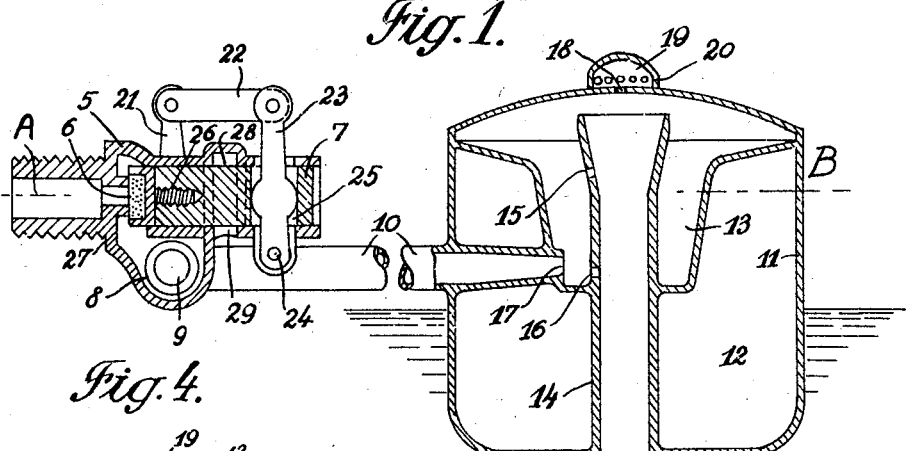
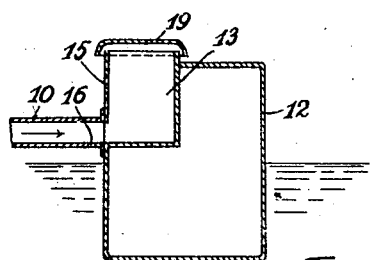
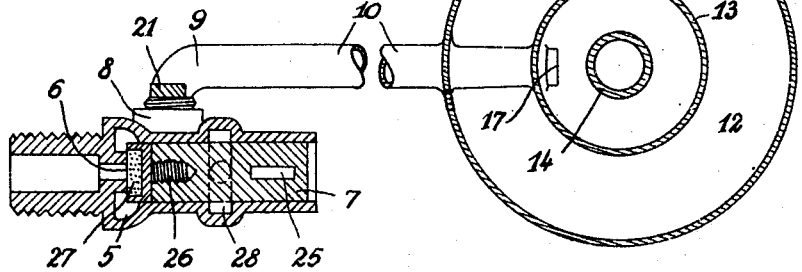
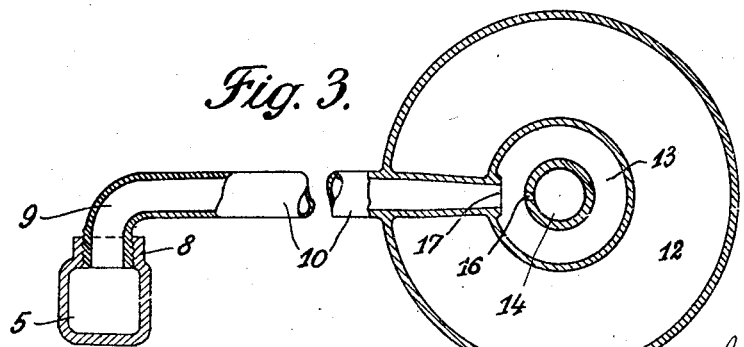

Patented Nov. 20, 1928.

1,692,289

UNITED STATES PATENT OFFICE.

NIELS PETER DAMGAARD, OF COPENHAGEN, DENMARK.

FLOAT VALVE.

Application filed December 28, 1925, Serial No. 78,024, and in Germany April 4, 1925.

This invention has reference to a float valve of the kind employed with fluid cisterns and serving the purpose of automatically putting a stop to the fluid supply when the surface of the fluid has reached a certain height. The float valves usually employed have all the disadvantages that they do not speedily stop the supply, and with the consequence that the fluid is filtered in the fissure between the valve seat and the valve body, so that a coating of impure particles adheres to the valve seat and the valve body, thus making the valve leaky; the particular parts being besides quickly worn out, so that the valve, even if frequently cleaned, quickly will become unfit for use.

It has been attempted to obviate the above disadvantages by weighting the float with a bowl filled with fluid, which bowl, when the fluid supply, directly before the final closure, considerably decreases, is emptied of fluid; whereby the buoyancy is enabled to close the valve rapidly. The said float valves, however, possess various kinds of disadvantages, and so they have not hitherto been used practically.

The object of this invention is to obviate these disadvantages and furthermore to make a float valve which operates without any noise, is reliable in any and every case, and which is of a common and inexpensive construction; yet the movable parts of the valve are not more numerous than those of an ordinary float valve.

A constructional form of the invention is shown in the drawing.

Fig. 1 is a vertical longitudinal section through a float valve intended for use in connection with a flushing cistern for water closets;

Fig. 2 is a horizontal section through the same on line A—B of Fig. 1;

Fig. 3 is a horizontal sectional view showing the connection of the float arm with the valve casing; and Fig. 4 is the float somewhat altered.

In a valve casing 5, which may be connected to a water inlet-pipe and which has a valve seat 6, is disposed a lengthwise shiftable valve body 7. A stiff angular pipe or hollow rod 9, 10, as shown in Figs. 1 and 3, is screwed into one of the side walls of the valve casing 5, opposite to an extension of the same. The said pipe has at its free end a float 11 consisting of an outer tank 12 and an inner tank 13. The outer tank 12 surrounds a space enclosed on all sides; whereas the inner tank 13, which is closed at the top, is connected to the under side of the float 11 by a vertical funnel-shaped pipe 14 open at both ends. In the wall of the pipe 14 there are superposed openings 15 and 16 of which the lowest is situated right opposite to the tapering end 17 of the pipe 10. The said pipe 10 is passed air-tight through both the outer wall of the tank 12 and that of the tank 13. At the top of the tank 13 is an opening 18, which ordinarily serves the purpose of releasing the air in the tank 13, when the water from the valve is rushing into the tank. The opening 18, as shown in Fig. 1, may be surrounded by a cover 19 with lateral openings 20.

The angular piece 9 of the pipe, which fits tight into the casing 5, but, as shown in Fig. 3, is not screwed close against any collar of the casing 5, is easy to turn relatively to said casing, so that the float 11 can follow the rising and the falling of the surface of the water. To the angular piece 9 is secured an upturned arm 21, which by a connecting arm 22 is connected to another upturned arm 23, which can swing on a horizontal pin 24 fitted on the casing 5. The arm 23 is passed through an aperture 25 in the valve body 7, so that the said body moves backward and forward when the arm 23 is swinging on the pin 24.

Into that end of the valve body 7 which faces the valve seat 6 is screwed a screw 26, into the head of which is founded a hard rubber packing 27. When the float 11 is raised, through the lever system 21, 22 and 23 there is produced a pressure on the valve body 7, so that the packing 27 is pressed against the valve seat 6. The fact that the packing 27 is founded into a recess in the head of the screw 26 permits the packing to be exchanged easily and rapidly without the packing or the valve body 7 being damaged, by unscrewing the screw 26 and screwing in another screw with another hard rubber packing.

In the valve casing 5 is a channel 28 surrounding the valve body 7 and having a downward opening connecting with the exterior air. Water that leaks into the space between the valve casing 5 and the valve body 7, passes to this channel and then through the opening 29 into the cistern, in which the float is disposed. Thus the squirting of the water and the noise involved thereby is avoided. To the opening 29 may be attached a pipe discharging under the surface of the water in the cistern.

Instead of forming the channel 28 in the inner wall of the valve casing 5 it may be formed in the valve body 7, a groove being made on the circumference of the said body.

The float valve described operates as follows:

If the water in the cistern be raised so much that the float 11, as shown in Fig. 1, through the lever system 21, 22 and 23 presses the valve body 7 with the packing 27, against the valve seat 6, then the valve closes, and no water runs into the cistern. If the discharge-pipe of the cistern is then opened, the surface of the water will fall very rapidly, and the float 11 will then, owing to its weight, also sink. Thereby the valve body 7 is carried away from the valve seat 6. The water rushes in, runs through the angular pipe 9, 10 into the tank 13 which will be filled with water, and then leaves the said tank through the pipe 14, the water from above partly running down into the said pipe, and partly running through the openings 15 and 16. A small part of it runs through the opening 18 and down the sides of the float. As the pipe 14 discharges under the surface of the water, the movement of the water through the tank 13 is absolutely soundless.

Since the flow from the cistern, however, is larger than the inflow, the cistern is emptied quickly, whereafter the discharge pipe is closed. As the admission of water through the valve casing 5 continues, the cistern is filled little by little, and the rising surface of the water now raises the float 11. The said float, however, is weighted with the tank 13 which is constantly filled with water, as the flow therefrom, owing to the restricted discharge, is not larger than the inflow through the pipe 10. On account of the said weight the float 11 lies rather deep relatively to the surface of the water in the cistern. According as the float 11 is raised, the valve body 7 approaches the valve seat 6, so that the supply decreases. Finally the supply will be smaller than the discharge, and so the tank 13 will be emptied of water. This is done at decreasing speed, the water at first flowing away partly at the top through the pipe 14; later on only through the said openings 15 and 16, and at last only through the opening 16. As the water in the tank 13 falls, the float rises relatively to the surrounding surface of the water, and since the fall of the water in the tank 13 only takes a very short time, the valve body 7 will be pressed against the valve seat 6 rapidly and powerfully. Consequently the valve will not have the time for filtering the water, and the impurity therein will not adhere to the valve and valve seat, the said valve being either entirely closed or open to such an extent that the flowing water removes all impurity. Owing to the water leaving the tank 13 at a decreasing speed, the valve, even at momentary high pressures in the inlet pipe, closes without any noise so that the valve and valve seat are not damaged even after a long use. If a greater number of cisterns are connected by a water tube of small diameter, a considerable drop of pressure in the water tube will take place, when several cisterns are in use at the same time.

The size of the openings 15 and 16 is fixed accordingly, and as the opening 16 is very small, immediately after the valve is closed there will be considerable water left in the tank 13, but the float 11 will have buoyancy enough to keep the valve closed even at a higher pressure in the water tube when this quantity of water has left the tank 13 through the opening 16.

Owing to the fact that the opening 16 is very small, the tank 13 can be weighted by the water of the tank longer than if the opening 16 had been larger. So the height of the fluid in the cistern is about the same whether the pressure of water in the conduit be large or small. This fact is very important.

The end 17 of the pipe 10 opening in the tank 13 is pointed and directed right towards the opening 16, so that the water can rush into the tank 13 at high pressure, thus removing every impurity that may adhere to the bottom of the tank 13 and fill up the opening 16.

When the valve in the discharge pipe is opened and the surface of the water in the cistern falls the float descends and opens the valve and thereafter water flows into the tank 13. The aperture 16 of the pipe 14 being very small, the first small inflow of water escapes slowly from the tank 13 and therefore the water in the tank weights the float 11. This added weight presses the float farther down in the surrounding water and the full inflow of water takes place. The valve opens rapidly for the full water supply, and the final closing movement of the valve is rapid.

The float valve will never close too early, and the water will always leave the tank 13.

The float shown in Fig. 4 differs from the above mentioned float by the aperture 16 being formed in the wall of the pipe 10, and not in a pipe 14 as in Fig. 1. The construction shown in Fig. 4 is somewhat cheaper than the one described above.

Even when the tank 13 is full of fluid, the bottom of the said tank 13 is always above the surface of the water in the flushing tank and so the aperture 18 can always operate in the capacity of an air vent, preventing the fluid in the flushing tank from being sucked back through the inlet-pipe.

In the present invention it is absolutely necessary that the angular pipe 9, 10 should be quite stiff; or the float cannot act upon the valve precisely; moreover it is necessary that the said pipe should be strong enough to resist a high pressure and be fluid tightly connected to the valve casing 5; or the water cannot be admitted into the tank 13 at the requisite pressure. This pressure will result in the valve having a tendency to leak between the valve body 7 and the casing 5, and so it is especially necessary in this valve to employ the channel 28. As before described, the valve does not operate satisfactorily unless the water leaves the tank 13 at a decreasing speed. For the emptying of the tank 13 through a single aperture, which in this instance must be rather large, leads to the consequence that the valve, when working at a low pressure, will operate like an ordinary float valve, and that it will be dripping when the pressure increases. The emptying of the tank 13 by means of a siphon results in the drawback that waterstrokes in the supply pipe, which often regardless of the closing are capable of pressing a few drops through the valve, will at last weight the float to such an extent that the valve will operate like an ordinary float valve without, however, being capable of turning to account to the full the rising water-level in the tank.

The strong movement of the water rushing into the tank 13 at high pressure leads to the consequence that impurity in the water is thrown up and removed through the upturned funnel-shaped outlet of the pipe 14, so that the impurity cannot adhere to the bottom of the tank 13.

The regulation of the water-level in the cistern when the valve is closed can be effected by varying the length of the connecting arm 22. If the length of the said arm is increased the float 11 must be raised farther before it closes the valve, and vice versa when the arm is made shorter. The valve operates equally whether it is in or below the surface of the water when the cistern is full. The flow from the tank 13 remains equally active.

Fig. 4 is a constructional form of the float which is more simple and cheaper than the one shown in Figs. 1-3, but which operates in exactly the same manner. It differs from the one shown in these figures in this that the communicating pipe 14 is entirely omitted, the fluid having entered the weighting tank 13, leaving the same through the openings 15 in the wall of the tank and 16 in the pipe 10, respectively, and thus running back into the fluid in the cistern.

The constructional form of the float valve shown in the drawing and herein described may be varied in many ways, and all the details of construction may be replaced by others with the same or similar effect. It may be mentioned, for instance, that the openings 15 and 16 in the pipe 14 can be replaced by a longitudinal fissure in the pipe 14.

I claim:

1. A float valve comprising a valve casing and a float loaded with a weighting tank communicating with the valve casing through a stiff, hollow rod, said rod entering both said weighting tank and said valve casing with tight joints, and swivelling in the latter.

2. A float valve comprising a valve casing and a float loaded with a weighting tank communicating with the valve casing through a stiff, hollow rod, said rod entering both said weighting tank and said valve casing with tight joints, the said rod, at its end entering the valve casing bent to an angle and provided with a screw thread, screwing into a corresponding thread in the valve casing and swivelling therein.

3. A float valve comprising a valve casing and a float loaded with a weighting tank communicating with the valve casing through a stiff, hollow rod, said rod entering both said weighting tank and said valve casing with tight joints, the said rod, at its end entering the valve casing bent to an angle and provided with a screw thread, screwing into a corresponding thread in the valve casing and swivelling therein, the said weighting tank provided with a discharge pipe, the upper end of which opens in the upper part of said tank, while the lower end is adapted to be below the level of the fluid in the cistern surrounding the float in the normal operation of the device.

4. A float valve comprising a valve casing and a float loaded with a weighting tank communicating with the valve casing through a stiff, hollow rod, said rod entering both said weighting tank and said valve casing with tight joints, the said rod, at its end entering the valve casing bent to an angle and provided with a screw thread, screwing into a corresponding thread in the valve casing and swivelling therein, the said weighting tank provided with a discharge pipe, the upper end of which opens in the upper part of said tank, while the lower end is adapted to be below the level of the fluid in the cistern surrounding the float in the normal operation of the device, the said discharge pipe having a flared upper end and several openings in its wall arranged at different levels and communicating with the interior of said weighting tank.

5. A float valve comprising a valve casing and a float loaded with a weighting tank communicating with the valve casing through a stiff, hollow rod, said rod entering both said weighting tank and said valve casing with tight joints, the said rod, at its end entering the valve casing bent to an angle and provided with a screw thread, screwing into a corresponding thread in the valve casing and swivelling therein, the said weighting tank provided with a discharge pipe, the upper end of which opens in the upper part of said tank, while the lower end is adapted to be below the level of the fluid in the cistern surrounding the float in the normal operation of the device, the said discharge pipe having a flared upper end and several openings in its wall arranged at different levels and communicating with the interior of said weighting tank, the lowermost of said openings opposite the entrance of said hollow rod.

6. A float valve comprising a valve casing, a valve body and a float loaded with a weighting tank communicating with the valve casing through a stiff, hollow rod, the said rod entering both said weighting tank and said valve casing with tight joints, the said rod, at its end entering the valve casing bent to an angle and provided with a screw thread, screwing into a corresponding thread in the valve casing and swivelling therein, an arm attached to said angular part of the said rod, said arm coupled by a connecting bar with a second arm swivelling on a pin on the valve casing, said swivelling arm entering into an opening in the valve body.

7. A float valve comprising a valve casing, a valve body and a float loaded with a weighting tank communicating with the valve casing through a stiff, hollow rod, the said rod entering both said weighting tank and said valve casing with tight joints, the said rod, at its end entering the valve casing bent to an angle and provided with a screw thread screwing into a corresponding thread in the valve casing and swivelling therein, an arm attached to said angular part of the said rod, said arm coupled by a connecting bar with a second arm swivelling on a pin on the valve casing, said swivelling arm entering into an opening in the valve body, in the seating end of the valve body a removable screw with a recessed head, and in said recessed head a valve packing.

8. A float valve comprising a valve casing, a valve body and a float loaded with a weighting tank communicating with the valve casing through a stiff, hollow rod, the said rod entering both said weighting tank and said valve casing with tight joints, the said rod, at its end entering the valve casing bent to an angle and provided with a screw thread screwing into a corresponding thread in the valve casing and swivelling therein, an arm atached to said angular part of the said rod, said arm coupled by a connecting bar with a second arm swivelling on a pin on the valve casing, said swivelling arm entering into an opening in the valve body, in the seating end of the valve body a removable screw with a recessed head, and in said recessed head a valve packing, an enlargement of the valve casing having an annular groove around the valve body and opening below into the cistern.

9. A float valve comprising a valve casing and a float loaded with a weighting tank communicating with the valve casing through a stiff, hollow rod, said rod entering both said weighting tank and the said valve casing with tight joints, the said rod, at its end entering the valve casing bent to an angle and provided with a screw thread screwing into a corresponding thread in the valve casing and swivelling therein, on the top of said weighting tank a lid.

10. A float valve comprising a valve casing and a float loaded with a weighting tank communicating with the valve casing through a stiff, hollow rod, said rod entering both said weighting tank and said valve casing with tight joints, the said rod, at its end entering the valve casing bent to an angle and provided with a screw thread screwing into a corresponding thread in the valve casing and swivelling therein, the said weighting tank provided with several discharge openings in its wall arranged at different levels.

11. A float valve comprising a valve casing and a float loaded with a weighting tank communicating with the valve casing through a stiff, hollow rod, said rod entering both said weighting tank and said valve casing with tight joints, the said rod, at its end entering the valve casing bent to an angle and provided with a screw thread screwing into a corresponding thread in the valve casing and swivelling therein, the said weighting tank provided with several discharge openings arranged at different levels, the lowermost opening arranged opposite the end of said hollow rod.

12. A float valve comprising a valve casing and a float loaded with a weighting tank communicating with the valve casing through a stiff, hollow rod, said rod entering both the said weighting tank and the said valve casing with tight joints, the said rod, at its end entering the valve casing bent to an angle and swivelling in an enlargement of the valve casing.

In witness whereof he affixes his signature.

NIELS PETER DAMGAARD.